(12) United States Patent
Mueller

(10) Patent No.: US 7,267,512 B1
(45) Date of Patent: Sep. 11, 2007

(54) POWER ASSISTED DRILL PRESS

(76) Inventor: Thomas L. Mueller, 6501 River Farm Dr., St. Louis, MO (US) 63129

( * ) Notice: Subject to any disclaimer, the term of this patent is extended or adjusted under 35 U.S.C. 154(b) by 0 days.

(21) Appl. No.: 11/498,547

(22) Filed: Aug. 4, 2006

Related U.S. Application Data

(62) Division of application No. 10/664,452, filed on Sep. 20, 2003, now Pat. No. 7,108,459.

(60) Provisional application No. 60/412,701, filed on Sep. 23, 2002.

(51) Int. Cl.
*B23B 45/14* (2006.01)
*B23B 47/22* (2006.01)

(52) U.S. Cl. .................. 408/1 R; 408/76; 408/112; 408/130

(58) Field of Classification Search ............ 408/1 R, 408/76, 87, 110–112, 130, 712; 173/2, 4, 173/11; *B23B 47/22, 45/14*
See application file for complete search history.

(56) References Cited

U.S. PATENT DOCUMENTS

| | | | | |
|---|---|---|---|---|
| 1,764,098 A | * | 6/1930 | Galloway | 408/11 |
| 1,994,516 A | * | 3/1935 | Hawn | 408/56 |
| 2,140,901 A | * | 12/1938 | Etzenhouser et al. | 408/56 |
| 2,151,205 A | * | 3/1939 | Hawn | 408/56 |
| 2,643,555 A | * | 6/1953 | Steibel | 173/18 |
| 2,865,236 A | * | 12/1958 | Parke | 408/130 |
| 2,883,891 A | * | 4/1959 | Robinson et al. | 408/112 |
| 2,909,949 A | * | 10/1959 | Winslow | 408/10 |
| 2,910,895 A | * | 11/1959 | Winslow | 408/10 |
| 2,947,205 A | * | 8/1960 | Wilson | 408/92 |
| 3,024,672 A | * | 3/1962 | Smallpeice | 173/15 |
| 3,041,897 A | * | 7/1962 | Linsker | 408/130 |
| 3,141,509 A | * | 7/1964 | Bent | 173/19 |
| 3,145,588 A | * | 8/1964 | King | 173/152 |
| 3,162,066 A | * | 12/1964 | Morey et al. | 408/76 |
| 3,164,040 A | * | 1/1965 | Reynolds | 408/130 |
| 3,362,266 A | * | 1/1968 | Krafft | 408/10 |
| 3,704,074 A | * | 11/1972 | Deschner | 408/11 |
| 3,726,348 A | * | 4/1973 | Seegan | 173/20 |
| 3,838,934 A | * | 10/1974 | Petroff | 408/7 |
| 3,854,836 A | * | 12/1974 | Weissman | 408/14 |
| 3,915,241 A | * | 10/1975 | Bieri | 173/32 |
| 3,941,496 A | * | 3/1976 | Weissman | 408/130 |
| 4,037,982 A | * | 7/1977 | Clement | 408/61 |
| 4,329,092 A | * | 5/1982 | Ponitzsch et al. | 408/11 |
| 4,357,124 A | * | 11/1982 | Dudden et al. | 408/130 |
| 4,534,682 A | * | 8/1985 | Carlson | 408/14 |
| 4,594,030 A | * | 6/1986 | Weigel, Jr. | 408/10 |
| 4,679,969 A | * | 7/1987 | Riley | 408/87 |
| 4,740,120 A | * | 4/1988 | Wickham et al. | 408/130 |
| 5,205,682 A | * | 4/1993 | Jinkins | 408/46 |

(Continued)

*Primary Examiner*—Monica Carter
*Assistant Examiner*—Eric A. Gates
(74) *Attorney, Agent, or Firm*—Kevin L. Klug

(57) ABSTRACT

A power assisted drill press having a feed cylinder fed by a variable pressure regulator which allows a user to controllably feed a bit and work material together while activating a drill motor to rotate the bit. An embodiment of the power assisted drill press utilizes a suction cup and venturi system for attachment of the press to a surface work material. The drill press uniquely allows a person to variably activate the feed cylinder and also activate the drill motor with a single hand.

5 Claims, 7 Drawing Sheets

U.S. PATENT DOCUMENTS

| | | | |
|---|---|---|---|
| 5,295,771 A * | 3/1994 | Wehrmann et al. ............ 408/67 |
| 5,383,751 A * | 1/1995 | Wheetley et al. ............ 408/1 R |
| 5,409,072 A * | 4/1995 | Enlund et al. ................. 175/71 |
| 5,771,981 A * | 6/1998 | Briggs et al. .................... 173/4 |
| 5,778,990 A * | 7/1998 | Niemi .......................... 175/27 |
| 5,961,258 A * | 10/1999 | Ende et al. .................. 408/103 |
| 6,099,213 A * | 8/2000 | Kammeraad et al. .......... 408/14 |
| 6,295,710 B1 * | 10/2001 | Roberts et al. ........... 29/407.01 |
| 6,296,426 B1 * | 10/2001 | King et al. .................... 408/76 |
| 6,413,022 B1 * | 7/2002 | Sarh ............................ 408/76 |
| 6,722,447 B2 * | 4/2004 | Stepan et al. ................... 173/1 |
| 6,776,562 B2 * | 8/2004 | Morrison et al. .............. 408/56 |
| 6,796,014 B2 * | 9/2004 | Sarh ........................ 29/407.09 |
| 6,938,702 B2 * | 9/2005 | Saha et al. ....................... 173/1 |
| 7,108,459 B1 * | 9/2006 | Mueller ....................... 408/112 |
| 2004/0101376 A1 * | 5/2004 | Shemeta ..................... 408/130 |
| 2004/0206523 A1 * | 10/2004 | Giardino ..................... 173/176 |
| 2005/0077064 A1 * | 4/2005 | Oouchi et al. ............. 173/93.5 |
| 2006/0180632 A1 * | 8/2006 | Oouchi et al. .............. 227/130 |

* cited by examiner

POWER ASSISTED DRILL PRESS

This application claims priority of U.S. Provisional Patent Application No. 60/412,701, filed Sep. 23, 2002. This application is a divisional of U.S. parent utility application Ser. No. 10/664,452, entitled Power Assisted Drill Press, filed Sep. 20, 2003 now U.S. Pat. No. 7,108,459.

BACKGROUND OF THE INVENTION

The present invention relates in general to drill press devices, and more particularly to a novel drill press apparatus having a controlled power assisting feed mechanism and a vacuum holding system.

In a conventional drill press, a rack and pinion gear is typically used to linearly move the rotating drill chuck toward the work material. The rack and pinion system applies the force to the drill bit through said chuck. Said drill bit utilizes said force to bore through the work material. Unfortunately, a conventional drill press is often heavy, not portable, and unable to drill a hole onto a surface unless the work material is between the drill and drill press table or base. Even the commercially available drill press stands which utilize conventional hand held drill motors, exhibit Other aforesaid undesirable features. Moreover, those commercially available drill presses which are Treasonably portable rely upon a magnetic base or clamps for attachment, mounting, and holding. This unfortunately limits use to magnetically attachable materials such as steel or iron or tends to mark or deform the mounting surface respectfully.

The present art overcomes the prior art limitations by providing a drill motor and chuck combination which is mounted with a motor frame and linearly actuated via the force of a feed cylinder. Preferably, the feed cylinder is a pneumatically actuated cylinder but may also be hydraulic, electromagnetic, or a mechanical force actuator in alternative embodiments. Also, the drill motor is preferably a commercially available pneumatically operated hand held drill with attached chuck but may also be electrically or hydraulically actuated, whether commercially available or custom built for the present art. The linearly moveable motor frame is movably mounted onto or with a press frame. The present art further provides for quick and easy securing and removal of the press onto a surface via the action of a suction cup. The suction cup attachment method allows for non-deforming attachment and mounting to surfaces which are either magnetic or non-magnetic.

An alternative embodiment of the present invention places the feed cylinder at a base plate instead of a top plate. This alternative embodiment allows the feed cylinder to apply force to and move the work material toward the drill bit instead of the drill bit moving toward the work material. This alternative embodiment preferably secures the drill motor to the top plate of said press frame which also functions as a motor frame. Further alternative embodiments may utilize both a feed cylinder on the top plate and a feed cylinder on the base plate. In this configuration, typically the shaft of the air cylinder mounted on the base plate contains a shaft tip having a recess for drill bit clearance when the bit bores through the work material. Alternative embodiments may forego use of the shaft tip without departing from the scope of the present art.

The preferred embodiment of the present invention provides a lightweight and portable power assisted drill press apparatus which only requires compressed air for operation. A further embodiment of the present invention provides a unique suction cup base which allows for mounting on any surface capable of holding the vacuum of said suction cup. This alternative mounting method allows for power assisted drilling on surfaces which otherwise would require drilling by hand.

Accordingly, it is an object of the present invention to provide an improved power assisted drill press which in a preferred embodiment is capable of full operation from a pneumatic supply.

Another object of the present invention is to provide an improved power assisted drill press which is portable and capable of controllably feeding the drill or work material via a user's actuation.

A further object of the present invention is to provide an improved power assisted drill press having a suction cup base which is capable of attaching to any surface which can maintain the suction cup vacuum, even if the surface is not planar or flat.

A still further object of the present invention is to provide an improved power assisted drill press which allows a person to operate the apparatus with a single hand when required.

SUMMARY OF THE INVENTION

To accomplish the foregoing and other objects of this invention there is provided an improved power assisted drill press apparatus for use in applications where a drill press is desired or required. In a preferred embodiment, the apparatus comprises a drill motor and chuck combination which is mounted with a motor frame and linearly actuated via the force of a feed cylinder. Alternative embodiments utilize a suction cup which provides for quick and easy securing and removal of the press onto a surface via the suction action of said cup. Further alternative embodiments place the feed cylinder at a base of the apparatus, thereby applying force to the work material and moving said material toward the drill bit instead of the drill bit moving toward the work material.

Preferably, the feed cylinder is a pneumatically actuated cylinder but may also be hydraulic, electromagnetic, or a mechanical force actuator. Also, the drill motor is preferably a commercially available pneumatically operated hand held drill with attached chuck but may also be electrically or hydraulically actuated, whether commercially available or custom built for the present art. The linearly moveable motor frame is movably mounted onto or with a press frame.

In a preferred embodiment, the motor frame first comprises a motor plate having a hole through which said drill motor is placed and held, preferably with a set screw. In a preferred embodiment, the drill motor chuck and drill bit extends through the motor plate. Attached with said motor plate is the first end(s) of one or more guide rods. Said guide rods preferably attach opposite of said drill motor chuck and drill bit extension. A second end(s) of said guide rod(s) aligns with and moveably mates through one or more guide holes in a top plate of the press frame. The top plate of said press frame is mounted onto, near, or toward a first end of a frame support or shaft which extends and mounts with a frame base.

In the preferred embodiment, one or more springs are placed onto said guide rods between said second end(s) and said top plate of the press frame. Near said second end(s) is preferably placed one or more keepers to maintain said springs in position and compression on said rods, between said top plate and said keepers. Said springs serve to supply retraction force to the motor frame when the feed cylinder is not actuated.

Also mounted onto said top plate of said press frame is the feed cylinder. Preferably said feed cylinder mounts between said second ends of said guide rods. In the preferred embodiment, the feed cylinder supplies a force onto said drill motor or motor frame and thereby causes the combination, including the guide rods, to move toward the work material. In the preferred embodiment, the feed cylinder is pneumatically controlled with an air pressure regulator. That is, the air pressure regulator controls and regulates the air pressure in the cylinder via the user's desired input, thereby controlling the force which is placed onto the work material through the drill bit.

Preferably, the air pressure regulator is mounted with or near said motor frame whereby the hand of the user stays near and follows the drill motor actuation switch and pressure regulator as the drill bit approaches the work material. A unique feature claimed in an embodiment of the present invention and in furtherance of the foregoing is the ability of the user to utilize the index finger to control the speed of the drill motor and the thumb of the same hand to control the force on and movement of the drill bit.

One of the embodiments of the present invention utilizes a suction cup mounted with a second end of said frame support. The suction cup allows the drill press to be mounted onto and drill into a surface. This feature is especially useful when the work material cannot fit between the drill bit and base plate. The feature, unlike magnetic base drill presses, allows attachment to a surface even if the surface has a low magnetic permeability such as aluminum, low iron content metals, and non metals such as plastics and woods. Said suction cup is preferably evacuated and held in place via the vacuum of a venturi attached with said suction cup. In the preferred embodiment, a pneumatic switch or valve is located on or near the motor frame or motor plate and allows the user to easily supply compressed air to the venturi which supplies vacuum to the suction cup.

An alternative embodiment of the present invention places the feed cylinder at the base plate instead of the top plate. This alternative embodiment allows the feed cylinder to apply force to and move the work material toward the drill bit instead of the drill bit moving toward the work material. This alternative embodiment preferably secures the drill motor to the top plate of said press frame which also functions as the motor frame.

For all of the aforesaid pneumatic devices, i.e. motor, switch, regulator, venturi, or other device, a pneumatic source is presumed available and able to feed each of the aforesaid components. The aforesaid press and motor frames and associated components may be manufactured from a variety of materials including but not limited to metals and alloys thereof, plastics, and composites. In a preferred embodiment, the frame and associated components are manufactured from an aluminum alloy and the guide rods and frame support are manufactured from steel.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
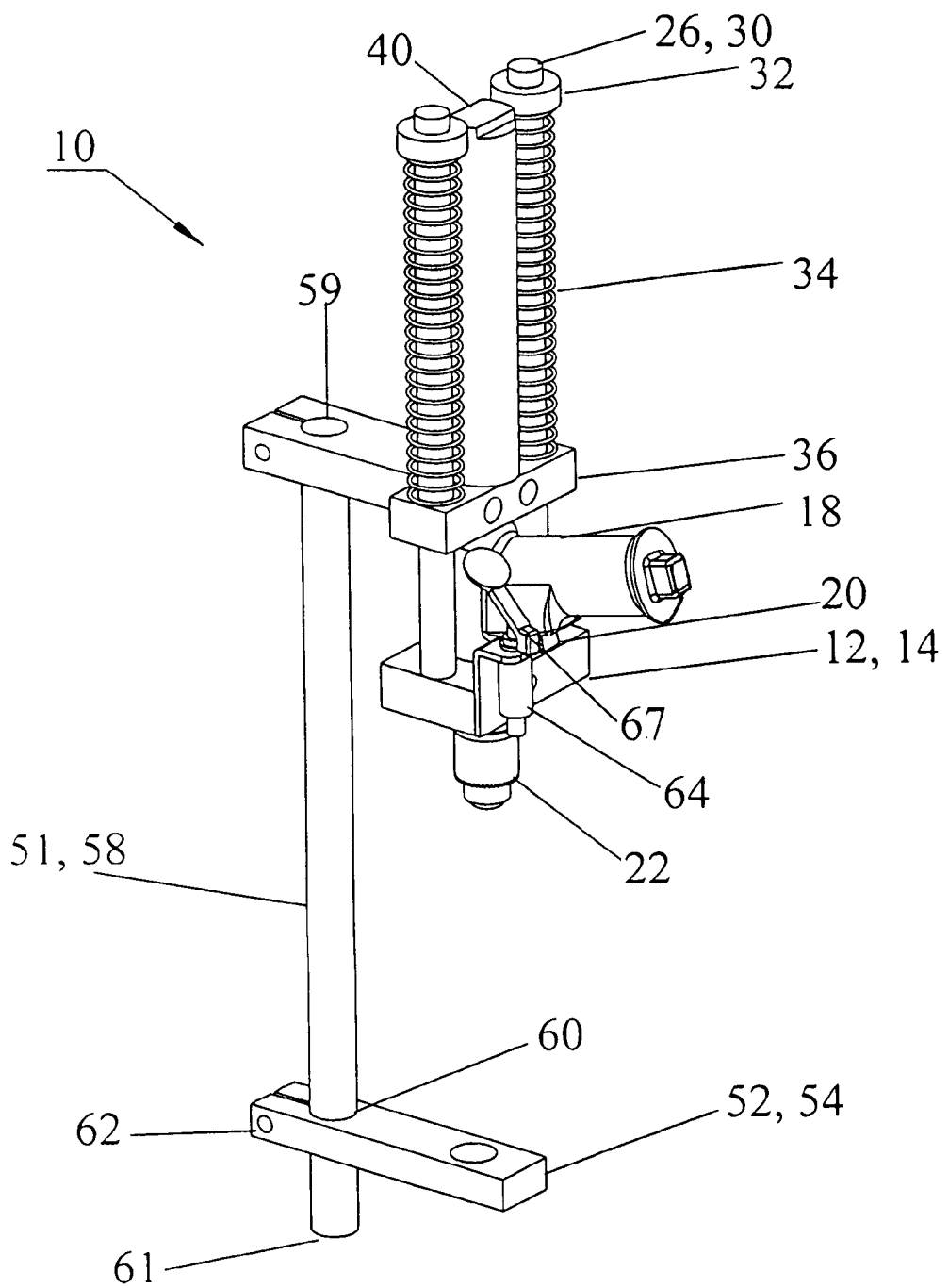
FIG. 1 shows a perspective view of the power assisted drill press without the air feed lines and the suction cup.
Figure 2:
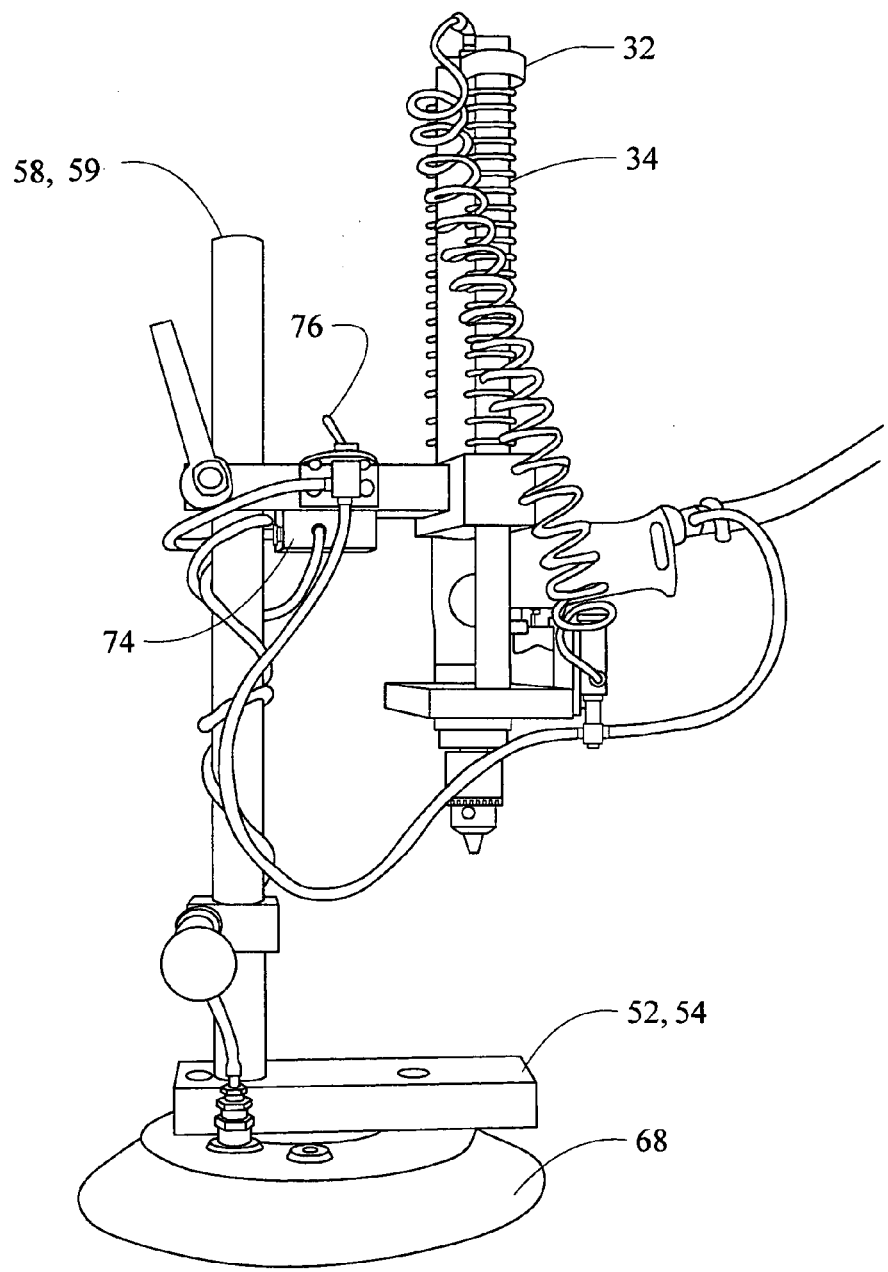
FIG. 2 shows a left side plan view of the power assisted drill press with the air feed lines and Other suction cup. The base plate is rotated into a position substantially near or in the same axis as the drill bit.
Figure 3:
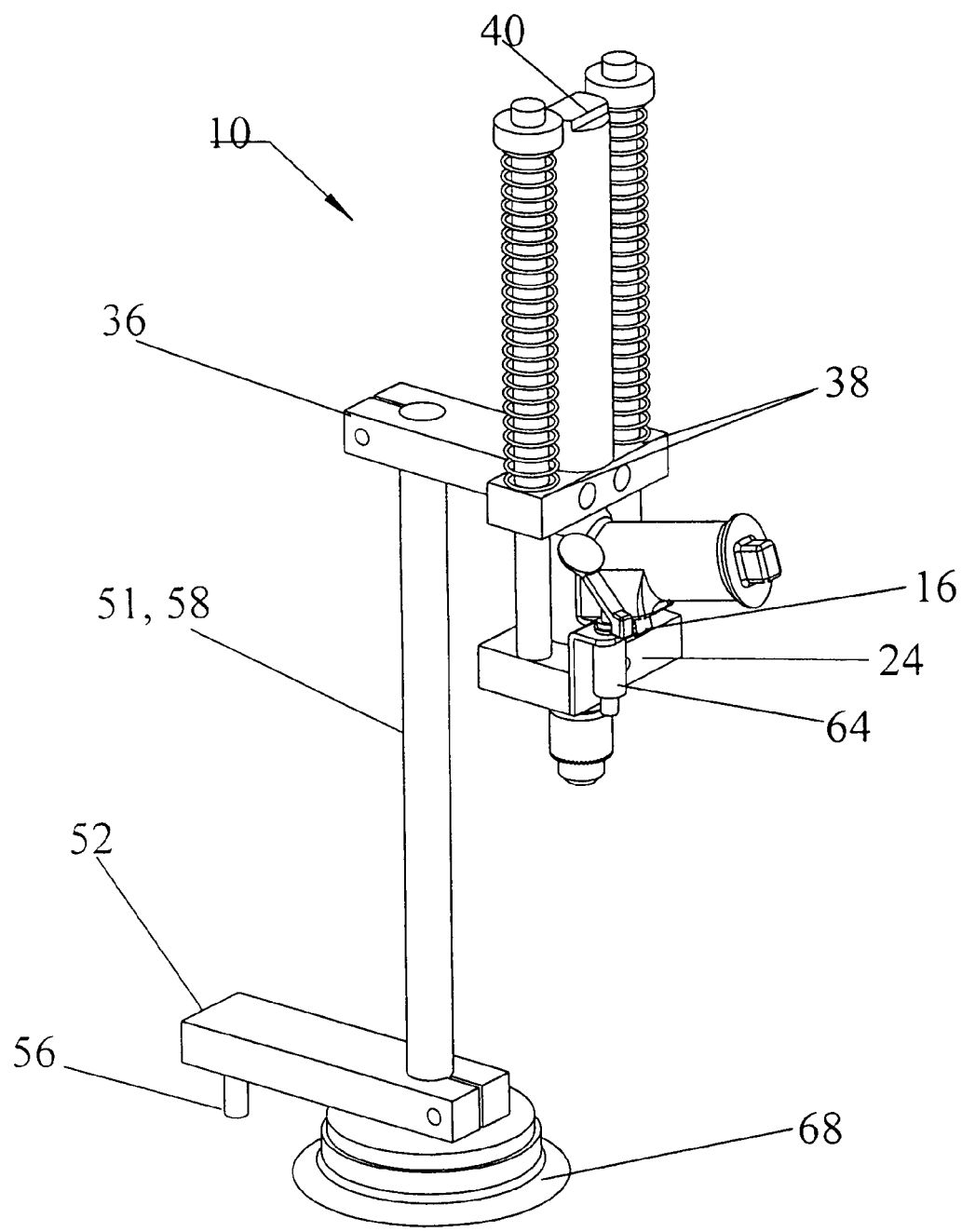
FIG. 3 shows a perspective view of the power assisted drill press with the suction cup and base plate support and without the air feed lines. The base plate is rotated to serve as a stabilizing moment arm relative to the drill bit force when the suction cup is utilized.
Figure 4:
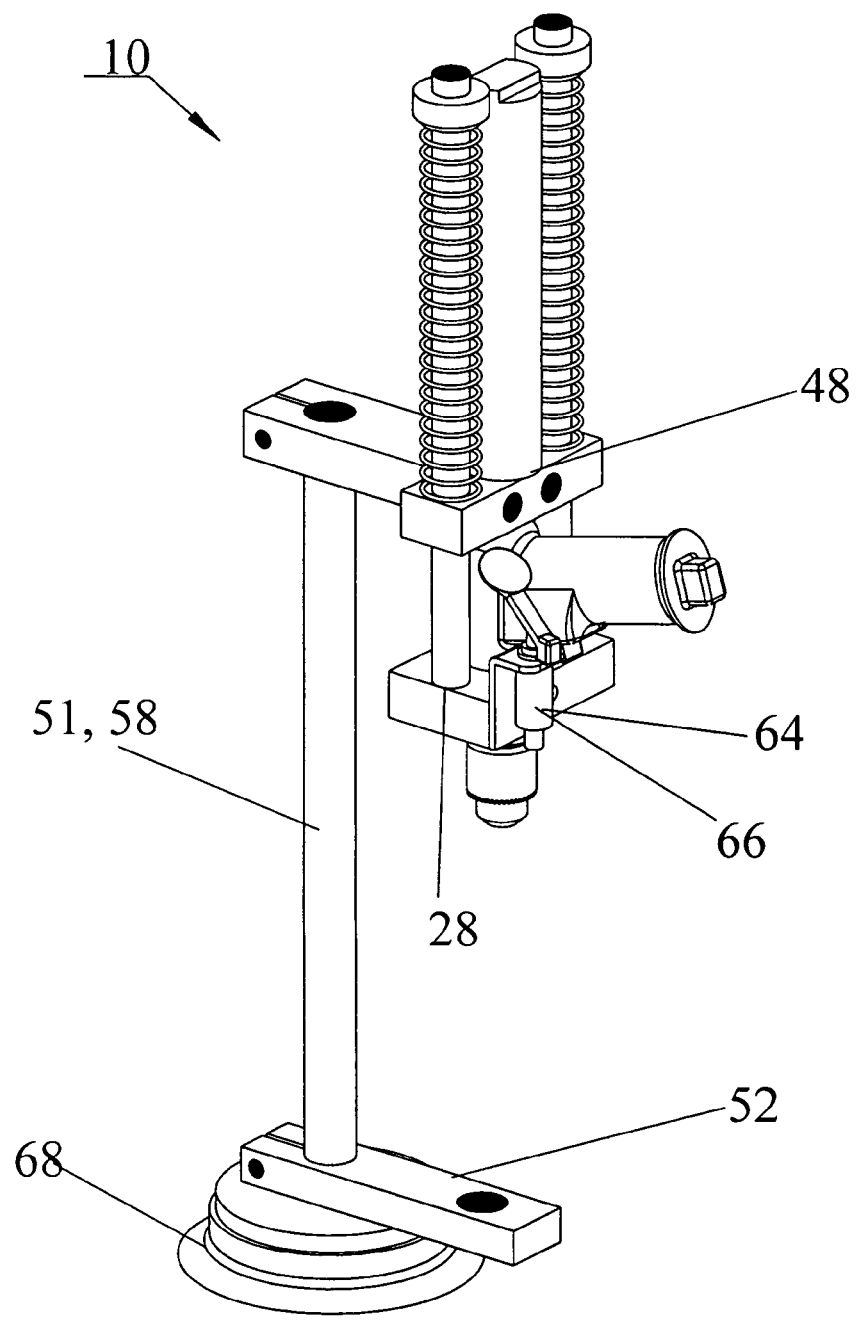
FIG. 4 shows a perspective view of the power assisted drill press with the suction cup and base plate support and without the air feed lines. The base plate is rotated into a position substantially near or in the same axis as the drill bit.
Figure 5:
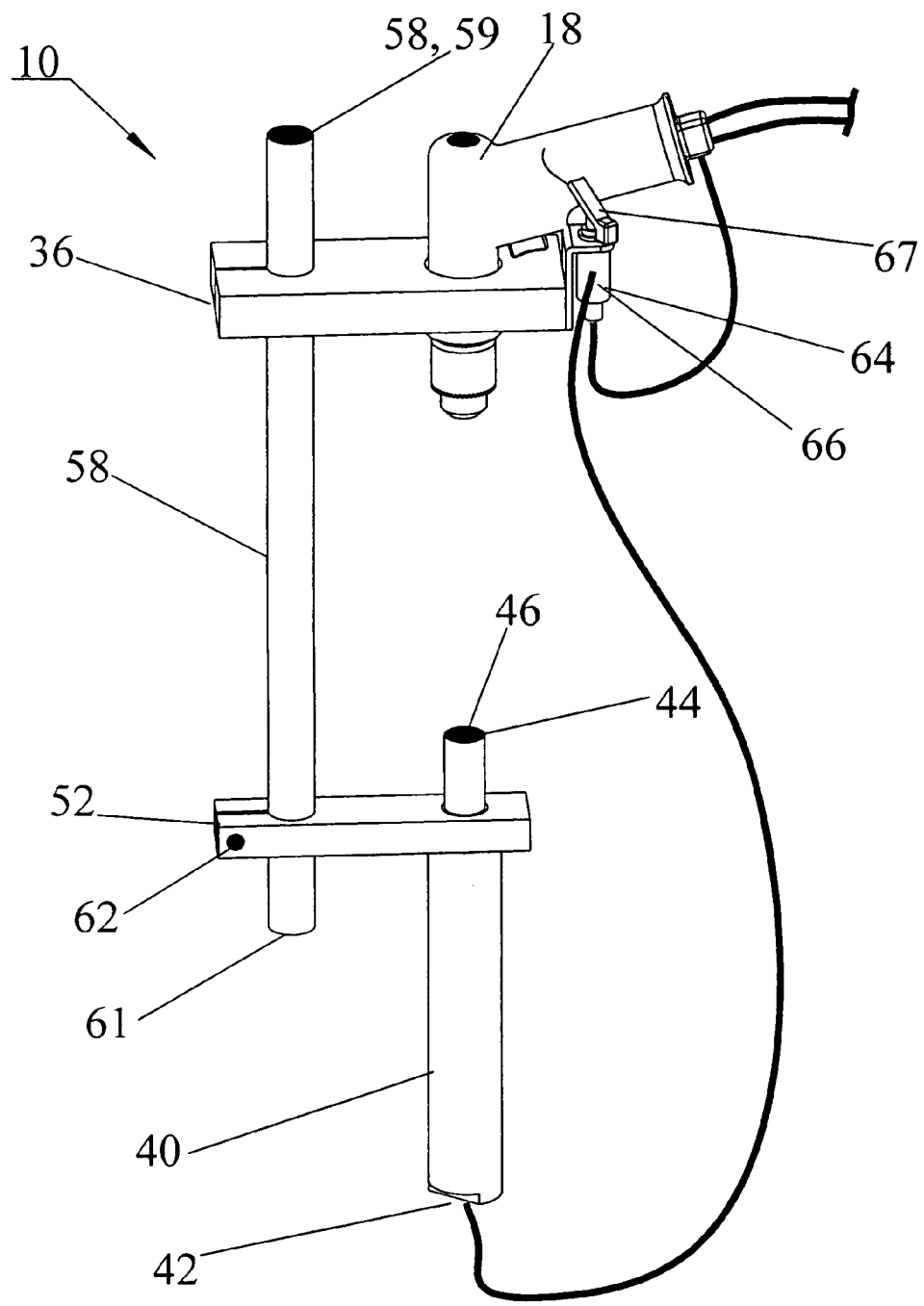
FIG. 5 shows a side plan view of an alternative embodiment of the power assisted drill press with the air feed lines. This alternative embodiment has the air feed cylinder located with the base plate.
Figure 6:
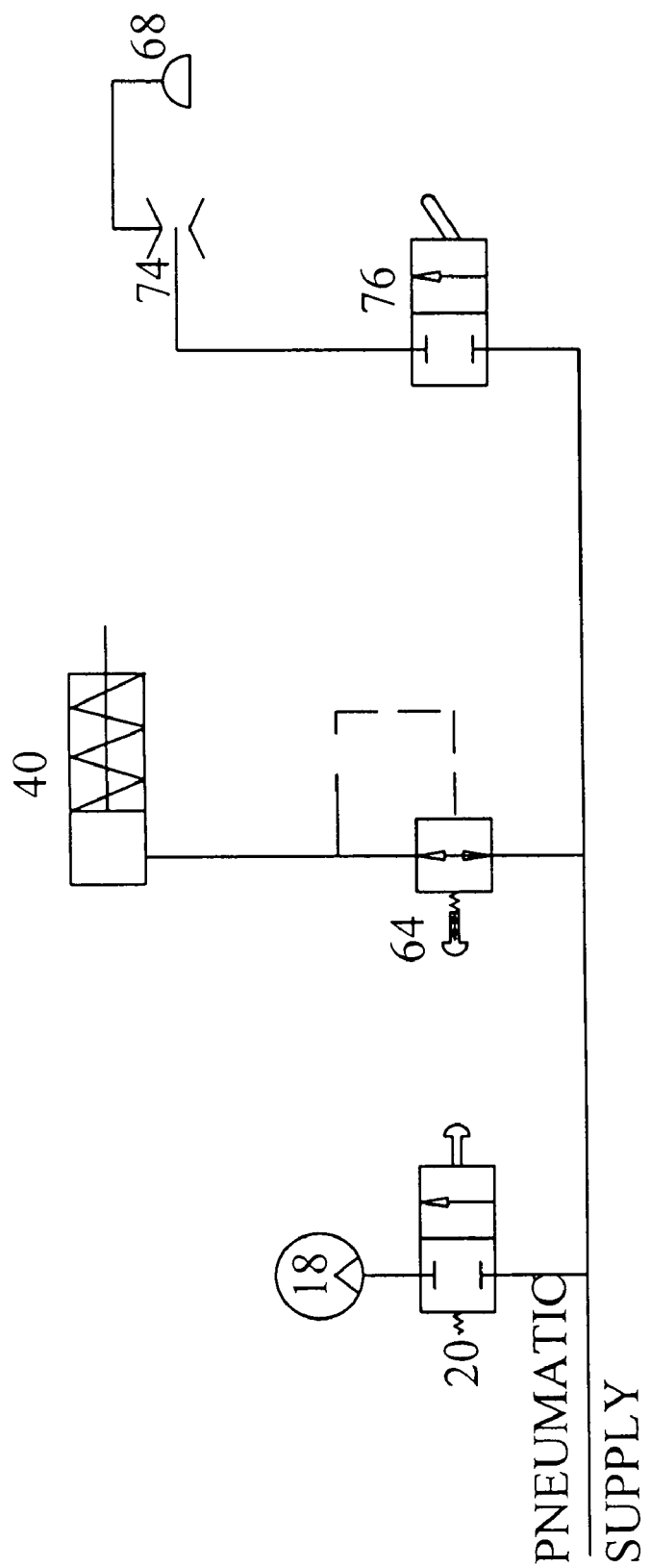
FIG. 6 shows a pneumatic schematic diagram of the air supply to the drill motor and valve, feed cylinder and regulator, and suction cup, venturi, and valve.
Figure 8:
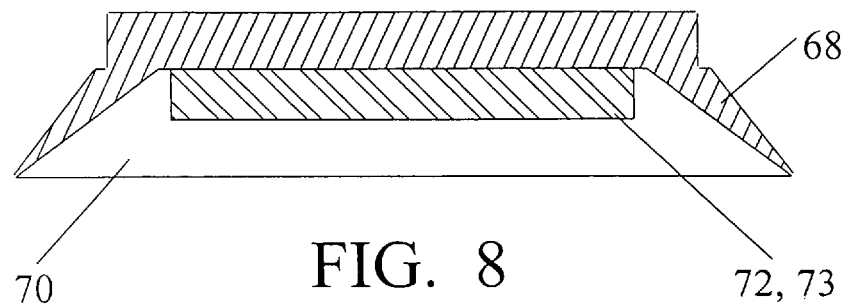
FIG. 8 shows a cross sectional view of the suction cup and mating plate of the present invention taken along line 7-7 in FIG. 7.
Figure 7:
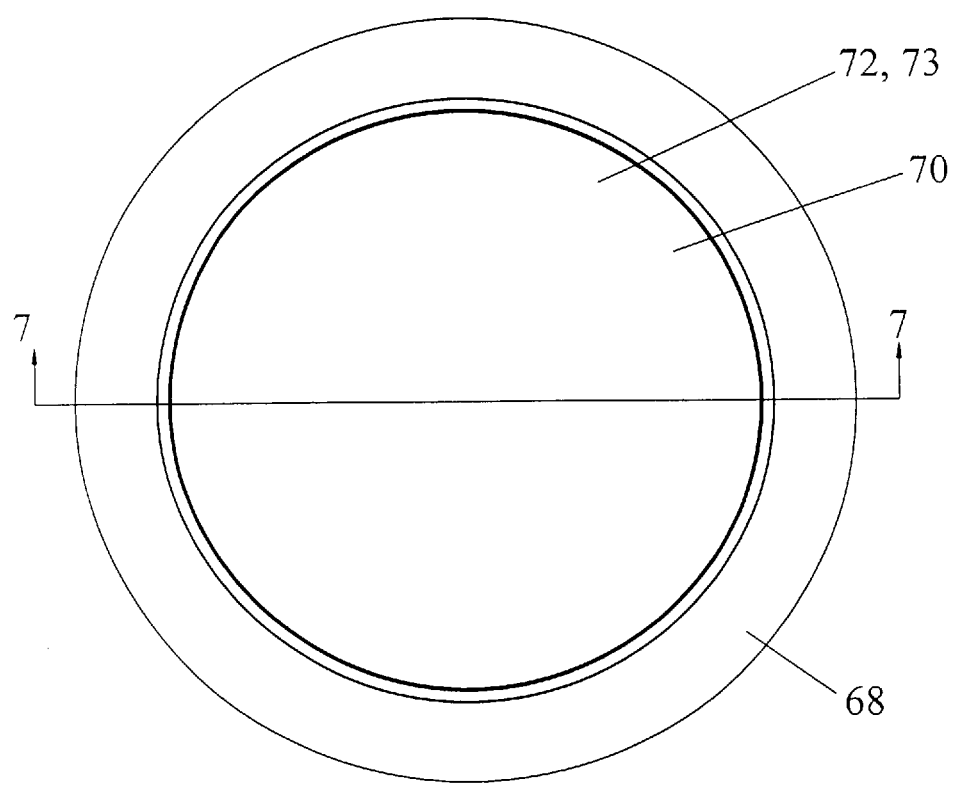
FIG. 7 shows a bottom plan view of the suction cup and mating plate of the present invention.

Referring now to the drawings, the improved power assisted drill press apparatus 10 is shown in its preferred and alternative embodiments. The apparatus 10 is especially useful in applications where a portable and self feeding drill press is desired or required and when said drill press requires non-destructive mounting on a non-magnetic surface.

The present art overcomes the prior art limitations by providing a drill motor 18 and chuck 22 combination which is mounted with a motor frame 12 and linearly actuated via the force of a feed cylinder 40. Preferably, the feed cylinder 40 is a pneumatically actuated cylinder but may also be hydraulic, electromagnetic, or a mechanical force actuator. Also, the drill motor 18 is preferably a commercially available pneumatically operated hand held drill with attached chuck 22 but may also be electrically or hydraulically actuated, whether commercially available or custom built for the present art. The linearly moveable motor frame 12 is movably mounted onto or with a press frame 51. The present art further provides for quick and easy securing and removal of the press 10 onto a surface via the action of a suction cup 68. A drill bit or equivalent element, including but not limited to countersink bits, reamer bits, taps, or deburring tool bits, are typically mounted within said chuck 22 to perform the desired drilling operation, but alternative embodiments may forgo use of the chuck 22 and utilize other means to attach the drill bit or equivalent element to the drill motor 18. In the preferred embodiment, said bit is opposite yet substantially pointing toward a plane of a second end 61 of a frame support 58 of said press frame 51.

In a preferred embodiment, the motor frame 12 first comprises a motor plate 14 having a hole 16 through which said drill motor 18 is placed and held, preferably with a set screw 24. In a preferred embodiment, the drill motor 18, chuck 22, and drill bit extends through the motor plate 14. Attached with said motor plate 14 is the first end(s) 28 of one or more guide rods 26. In the preferred embodiment, two guide rods 26 are utilized. Said guide rods 26 preferably attach opposite of said drill motor 18, chuck 22 and drill bit extension. Alternative embodiments may place or locate said guide rods 26 at various locations on or with said motor plate 14 without departing from the scope and spirit of the present invention. A second end(s) 30 of said guide rod(s) 26 aligns with and moveably mates through one or more guide holes 38 in a top plate 36 of the press frame 51. Alternative embodiments may attach the drill motor 18 and chuck 22 combination in a plurality of ways including but not limited to clamps, welds, or bolts.

In the preferred embodiment, one or more springs 34 are placed onto said guide rods 26 between said second end(s) 30 and said top plate 36 of the press frame 51. Near said second end(s) 30 is preferably placed one or more keepers 32 to maintain or contain said springs 34 in position and compression on said rods 26, between said top plate 36 and said keepers 32. Said springs 34 serve to supply retraction force to the motor frame 12 when the feed cylinder 40 is not actuated. Alternative embodiments may utilize springs in tension between said top plate 36 and said motor plate 14, supply retraction force with an air cylinder, or forego use of said springs 34 completely.

Also mounted onto said top plate 36 of said press frame 51 is the feed cylinder 40. Said top plate 36 having a through hole 48 for the moving shaft 44 of said cylinder 40 to contact and linearly move the drill motor 18 or motor frame 12. Preferably said feed cylinder 40 mounts between said second ends 30 of said guide rods 26. The feed cylinder 40 also is preferably mounted with threads into said through hole 48 of said top plate 36. Alternative embodiments may utilize any location or method of attachment of said feed cylinder 40 onto said top plate 36 without departing from the scope and spirit of the present invention.

In the preferred embodiment, the feed cylinder 40 supplies a force onto said drill motor 18 or motor frame 12 and thereby causes the combination, including the guide rods 26, to move toward the work material. In the preferred embodiment, the feed cylinder 40 is pneumatically controlled with a pneumatic or air pressure regulator 64. That is, the air pressure regulator 64 controls and regulates the value of the air pressure in the cylinder 40 via the user's desired input, thereby controlling the force which is placed onto the work material through the drill bit. That is, the air pressure regulator 64 has an activating lever 67 or switch which may be pushed to control the pneumatic pressure supplied by the regulator. As the lever 67 or switch is pushed or displaced, the pneumatic or air pressure supplied from the output port 66 increases relative to the aforesaid displacement. In the preferred embodiment, the output port 66 of the air pressure regulator 64 pneumatically feeds a pneumatic input port 42 of the feed cylinder 40 thereby creating a linear force onto said shaft 44 relative to the displacement of said lever 67. When the air pressure regulator 64 is released, the pressurized output port 66 is vented to atmosphere, thereby venting the feed cylinder 40 and allowing the motor frame 12 to retract via the action of said springs 34. In the preferred embodiment, the pressure regulator 64 is an MAR-1CP manufactured by Clippard. Alternative embodiments may utilize other brands or models of pressure regulators for cylinder movement.

Preferably, the air pressure regulator 64 is mounted with or near said motor frame 12 whereby the hand of the user stays near and follows the drill motor actuation switch 20 and pressure regulator 64 as the drill bit approaches the work material. A unique feature claimed in an embodiment of the present invention and in furtherance of the foregoing is the ability of the user to utilize the index finger to control the speed of the drill motor 18 via the actuation switch 20 and the thumb of the same hand to displace the lever 67 of the regulator 64 to control the force on and movement of the drill bit. The top plate 36 of said press frame 51 is mounted onto or near a first end 59 of a frame support 58 or shaft which extends and mounts with a frame base 52, thereby forming a gap between said frame base 52 and the bit. The preferred embodiment utilizes a cylindrical shaft 58 on which the frame base 52 may pivot or rotate. That is, the frame base 52 preferably has a through hole 60 of substantially the same size as the frame support shaft 58, thereby allowing the base 52 to pivotably fit over the support shaft 58. The frame base 52 preferably has one or more set screws 62 impinging onto the support shaft 58 to slidably hold said base 52 onto and at a desired position with said support shaft 58. Alternative embodiments may utilize other methods or means of mechanically fastening said frame base 52 onto said support shaft 58 without departing from the scope and spirit of the present invention. These include but are not limited to welds, threads, screws and bolts, frictional fits, and/or integral molding or casting.

In the preferred embodiment, said frame base 52 comprises a base plate 54 having the aforesaid support shaft hole 60. Alternative embodiments may utilize a frame base 52 having a plurality of shapes or sizes. Unique to the base plate 54 of the present invention is the extension of a base plate support 56, preferably a bolt or screw, from the base plate opposite the side closest to the drill bit. This feature is especially useful in conjunction with the suction cup 68 attachment embodiment. When utilized apart from the suction cup 68 attachment embodiment, the base plate 54 is typically rotated and secured under the drill bit. This allows the work material to be placed between the drill bit and base plate 54 during the drilling operation.

One of the embodiments of the present invention utilizes a suction cup 68 mounted with a second end 61 of said support shaft 58. The suction cup 68 allows the drill press 10 to be mounted onto and drill into a surface. This feature is especially useful when the work material cannot fit between the drill bit and base plate 54. This feature, unlike magnetic base drill presses, allows attachment to a surface even if the surface has a low magnetic permeability such as aluminum, low iron content metals, and non metals such as plastics and woods.

Said suction cup 68 is preferably evacuated and held in place via the vacuum of a venturi 74 attached with said suction cup 68. The suction cup 68 is commercially available from Schalmz GmbH, yet is modified for the present art. Other commercial manufacturers such as Anver and others provide equivalent suction cups which may be utilized with the present art. Within the cup cavity 70 is placed a mating plate 72 with a mating surface 73 which substantially conforms to the surface of the work material. In the preferred embodiment, the plate 72 is attached within said cup cavity 70 yet the mating surface 73 is positioned such that it does not extend beyond the surface represented by the large circumference of the suction cup 68. When the suction cup 68 is placed onto the work surface and the venturi 74 evacuates or draws a suction on said cup 68, the mating surface 73 of the mating plate 72 contacts the work surface thereby stabilizing the press frame 51. Alternative embodiments may forego utilization of the mating plate 72. The base plate 54 with its base plate support 56 is typically pivoted or rotated opposite or away from the location of drill bit contact with the work material and secured to the frame support shaft 58. The base plate support 56 is extended from the base plate 54 to contact the work surface and help stabilize the press frame 51 during the drilling operation. That is, the base plate 54 serves as a moment arm to provide a counteracting force relative to the drill bit force in order to maintain proper orientation of the press frame 51. Said base plate support 56 is preferably a threaded bolt or screw but may also comprise any mechanical support device which is capable of contacting the work surface and help stabilize the press frame 51.

In the preferred embodiment, a pneumatic switch 76 or valve is located on or near the motor frame 12 or motor plate 14 and allows the user to easily supply compressed air to the venturi 74 which supplies vacuum to the suction cup 68. Since this switch 76 is located near the user's hand, the user may easily turn on the pneumatic switch 76 prior to a drilling operation in order to secure the device via venturi 74 vacuum to the work surface. When the switch 76 is positioned in an off position, compressed air is no longer supplied to the venturi 74 and the venturi 74 allows the suction cup 68 to vent to atmosphere. In the preferred embodiment the venturi 74 comprises a Fastvac #VP00-60H manufactured by Vaccon but other manufacturers also commercially manufacture an equivalent venturi. In the preferred embodiment, the venturi 74 is mounted upon the base plate but may be mounted at any location which is desired, provided the suction cup 68 receives the required vacuum.

An alternative embodiment of the present invention places the feed cylinder 40 at the base plate 54 instead of the top plate 36. This alternative embodiment allows the feed cylinder 40 to apply force to and move the work material toward the drill bit or drill motor 18 instead of the drill bit moving toward the work material. This alternative embodiment preferably secures the drill motor 18 to the top plate 36 of said press frame 51 which also functions as the motor frame 12. Further alternative embodiments may utilize both a feed cylinder 40 on the top plate 36 and a feed cylinder 40 on the base plate 54. In this configuration, typically the shaft 44 of the feed cylinder 40 mounted on the base plate 54 contains a shaft tip 46 having a recess for drill bit clearance when the bit bores through the work material. Alternative embodiments may forego use of the shaft tip 46 without departing from the scope of the present art.

In operation, the user first connects an pneumatic compressed air supply to the power assisted drill press 10 of the present art. If the user desires to drill a work material which will fit between the base plate 54 of the frame base 52 and the drill bit, the user rotates and secures the base plate 54 in a position substantially near or in the same axis as the drill bit. The user then places the work material between said base plate 54 and the drill bit and activates or presses on the air pressure regulator 64 activating switch or lever 67 to begin application of a user variable pressure to the feed cylinder 40. As the drill bit is moved near or onto the work material due to the movement of the feed cylinder 40, the user activates the drill motor 18 via a valve or switch 20 which energizes the drill and rotates the drill bit. As the drill bit contacts the work material, the user may further press the air pressure variable regulator 64 activating switch or lever 67 to supply a higher pressure to the feed cylinder 40 and thereby increase the force on the drill bit. As the force on the drill bit increases, generally the speed of cutting increases. After the user completes the drilling procedure, the user may release the air pressure regulator 64 activating switch or lever 67 to vent the feed cylinder 40 to atmosphere, thereby allowing retraction of the drill bit from the work material. The suction cup 68 may be utilized to stabilize or secure the press onto a surface during the drilling process.

The alternative embodiment having the feed cylinder 40 located with the base plate 54, functions much as aforesaid. That is, the user places work material between the drill bit and the feed cylinder 40 shaft tip 46 and performs the same aforesaid operation. Instead of the drill bit moving relative to the press frame 51, the press frame 51 moves relative to the work material via the action of the feed cylinder 40.

If the user should desire to drill a hole in a surface work material which cannot be placed between the base plate 54 and the drill bit, the user then utilizes the aforesaid suction cup 68 to secure the press frame 51. That is, the user preferably first rotates the base plate 54 to a position substantially opposite the drill bit in order to serve as a stabilizing moment arm relative to the drill bit force. The base plate 54 is then secured via the set screw 62 impinging upon the frame support shaft 58. The user then turns on the valve 76 which supplies compressed air to the venturi 74 which then evacuates the suction cup 68 and draws the press frame 51 onto the surface with the mating plate 72 within the cup cavity 70 contacting the surface of the work material. The user may then adjust the base plate support 56 to contact the work material surface and allow the base plate 54 to provide the necessary counteracting moment arm relative to the drill bit. The user then repeats the aforesaid steps of activating the regulator 64 via the lever 67 and drill motor 18 via the actuation switch 20 to move the drill bit into contact with the work surface and drill the desired hole. Alternative embodiments may perform the aforesaid functions without utilization of the mating plate 72 or base plate 54.

From the foregoing description, those skilled in the art will appreciate that all objects of the present invention are realized. A power assisted drill press apparatus for drilling in non-conventional applications where a drill press is desired or required is shown and described. The drill press of the present art is especially suited to applications where portability is desired and with its suction cup mounting is especially useful for mounting upon surfaces which are non-magnetic.

Having described the invention in detail, those skilled in the art will appreciate that modifications may be made to the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A method for utilizing a power assisted drill press, the steps comprising:
    forming a power assisted drill press having a drill motor, a bit, and a pneumatic feed cylinder capable of moving said drill motor and bit toward a work material; and
    connecting an output of an air pressure regulator with said feed cylinder, said air pressure regulator having an activating lever or switch which can be displaced whereby an air pressure supplied from said output and to said feed cylinder increases relative to a displacement of said lever or switch; and
    displacing said activating lever or switch of said air pressure regulator substantially proportionally to a desired movement of said bit toward said work material and to a desired force onto said work material; and
    activating said drill motor whereby said bit performs work on said work material; and
    forcing said bit onto said work material substantially proportionally to a further displacing of said lever or switch of said air pressure regulator; and
    releasing said activating lever or switch of said air pressure regulator whereby said cylinder no longer moves said bit toward said work surface; and
    venting said feed cylinder; and
    retracting said bit from said work material; and activating and releasing said drill motor via an actuation switch; and mounting said drill motor with a motor frame; and forming a press frame having a frame support having a first and a second end and a frame base nearest said second end; and movably mounting said motor frame with said press frame and placing nearest said first end of said frame support whereby said bit is opposite yet substantially pointing toward a plane of said second end; and forming a gap between said bit and said frame base, said gap allowing said work material to be substantially placed; and mounting the pneumatic feed cylinder substantially with said press frame, said pneumatic feed cylinder having a moving shaft contacting said drill motor or motor frame and a pneumatic input port whereby applying a pneumatic pressure into said input port creates a force onto said shaft and thereby moves said shaft and said drill motor; and mounting said pressure regulator substantially with said motor or motor frame and connecting an output port with said input port of said feed cylinder and supplying said pneumatic pressure from said output port of said regulator in a pressure value relative to said activating lever or switch displacement and releasing said lever or switch whereby venting of said pneumatic pressure occurs; and placing said work material between said bit and said frame base; and displacing said activating lever or switch whereby said activating of said air pressure regulator occurs and said feed cylinder provides a force between said bit and said work material substantially proportional to said activating lever or switch displacement.

2. The method for utilizing a power assisted drill press as set forth in claim 1, the steps further comprising:

mounting a top plate with said frame support; and forming one or more guide holes within said top plate; and attaching said feed cylinder with said top plate; and slidably engaging one or more guide rods, each having a first end and a second end, through said guide holes; and mounting a motor plate with said motor frame; and attaching said first end of said guide rods with said motor plate; and positioning said guide rods to allow extension of said moving shaft of said feed cylinder; and moving said motor frame, said motor plate, and said one or more guide rods.

3. The method for utilizing a power assisted drill press as set forth in claim 2, the steps further comprising:

forming a base plate which comprises said frame base; and forming a through hole in said base plate of substantially the same size as said frame support; and slidably fastening said base plate with said frame support with said through hole.

4. The method for utilizing a power assisted drill press as set forth in claim 3, the steps further comprising:

inserting one or more springs between said second ends of said guide rods and said top plate and upon said one or more guide rods; and attaching one or more keepers near said second ends of said guide rods whereby said springs are contained between said keepers and said top plate; and retracting said motor frame when said feed cylinder pneumatic pressure is removed from said input port of said feed cylinder via a retraction force from said one or more springs.

5. The method for utilizing a power assisted drill press as set forth in claim 4, the steps further comprising:

positioning said actuation switch of said drill motor and said activating lever of said regulator to allow a user to utilize an index finger to actuate said drill motor switch while simultaneously utilizing a thumb to actuate said activating lever or switch of said regulator;

actuating said drill motor with said index finger; and actuating said activating lever or switch with said thumb.

* * * * *